(12) United States Patent
Blair et al.

(10) Patent No.: US 11,403,263 B2
(45) Date of Patent: Aug. 2, 2022

(54) TECHNIQUES FOR FILE VERSIONING TO PROTECT AGAINST FILE CORRUPTION

(71) Applicant: NETFLIX, INC., Los Gatos, CA (US)

(72) Inventors: John David Blair, San Jose, CA (US); Anders Grindal Bakken, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 159 days.

(21) Appl. No.: 16/432,824

(22) Filed: Jun. 5, 2019

(65) Prior Publication Data
US 2020/0387482 A1 Dec. 10, 2020

(51) Int. Cl.
*G06F 16/18* (2019.01)
*G06F 16/178* (2019.01)
*G06F 16/172* (2019.01)

(52) U.S. Cl.
CPC ........ *G06F 16/1873* (2019.01); *G06F 16/172* (2019.01); *G06F 16/178* (2019.01); *G06F 16/1847* (2019.01)

(58) Field of Classification Search
CPC ............... G06F 16/1873; G06F 16/172; G06F 16/1847; G06F 16/178
USPC ......................................................... 707/695
See application file for complete search history.

(56) References Cited

U.S. PATENT DOCUMENTS

| | | | |
|---|---|---|---|
| 6,415,357 B1* | 7/2002 | Wright | G06F 12/0893 711/133 |
| 9,460,177 B1* | 10/2016 | Pawar | G06F 16/1865 |
| 2007/0168398 A1* | 7/2007 | Miroshnichenko | G06F 16/10 |
| 2008/0027866 A1* | 1/2008 | Halcrow | G06F 21/6209 705/51 |
| 2009/0327360 A1* | 12/2009 | Rajaram | G06F 16/10 |
| 2012/0044349 A1* | 2/2012 | Hori | H04N 7/183 348/136 |
| 2012/0149342 A1* | 6/2012 | Cohen | H04L 51/26 455/412.2 |
| 2013/0227692 A1* | 8/2013 | Pavlyushchik | G06F 21/567 726/24 |
| 2014/0108671 A1* | 4/2014 | Watson | H04L 67/322 709/231 |

(Continued)

OTHER PUBLICATIONS https://www.kernel.org/doc/Documentation/sysctl/vm.txt, 15 pages.

(Continued)

*Primary Examiner* — Kuen S Lu
(74) *Attorney, Agent, or Firm* — Artegis Law Group, LLP

(57) ABSTRACT

Various embodiments disclose a method for maintaining file versions in volatile memory. The method includes storing, in volatile memory for at least a first portion of a first sync interval, a first version of a file that is not modifiable during the at least the first portion of the first sync interval. The method also includes storing, in volatile memory for at least a second portion of the first sync interval, a second version of the file that is modifiable during the at least the second portion of the first sync interval. The method also includes subsequent to the first sync interval, replacing in nonvolatile memory, a third version of the file with the first version of the file stored in volatile memory. Further, the method includes marking the second version of the file as not modifiable during at least a first portion of a second sync interval.

20 Claims, 8 Drawing Sheets

(56) References Cited

U.S. PATENT DOCUMENTS

2014/0201434 A1* 7/2014 Hassanpur .............. G06F 12/16
   711/104

OTHER PUBLICATIONS

International Search Report for application No. PCT/US2020/036102 dated Sep. 1, 2020.
Anonymous: "Cache (computing)—Wikipedia", Mar. 2, 2012, XP055677313, Retrieved from the Internet: URL:https://en.wikipedia.org/w/index php?title=Cache_(computing)&oldid=479772552, Mar. 17, 2020, 7 pages.

* cited by examiner

TECHNIQUES FOR FILE VERSIONING TO PROTECT AGAINST FILE CORRUPTION

BACKGROUND

Field of the Invention

Embodiments of the present invention relate generally to file systems and, more specifically, to techniques for file versioning to protect against file corruption.

Description of the Related Art

A video streaming service provides access to a library of media titles that can be viewed on a range of different client devices, where each client device may connect to the video streaming service under different connection and network conditions. In order to authenticate a user and personalize the user's experience, a client device uses secure application data to execute communications for various actions such as sign-in, browsing, and playback of content items. The client device stores the secure application data in secure sections of memory, such as a secure cache. In many implementations, the client device frequently updates a plurality of files that include secure application data. The client device saves these files in the secure data cache before writing the files to nonvolatile memory. Maintaining files in the secure data cache enables the client device to quickly access files and write files to volatile memory. Because such files would otherwise be stored in nonvolatile memory, such techniques improve performance of the client device.

One drawback of maintaining files in the secure data cache is that files can become corrupt or invalid before the files are written to nonvolatile memory. For example, a client device could initially write a file to the secure data cache. When the client device experiences a system failure, the files stored in the secure data cache could become invalid due to the system failure. Further, invalid files including secure application data could invalidate other files in the secure data cache, which would require the client device to reacquire data from other devices in the network.

As the foregoing illustrates, more effective techniques for maintaining data in the data cache are needed in the art.

SUMMARY OF THE INVENTION

One embodiment of the present invention sets forth a method for maintaining file versions in volatile memory. The method includes storing, in volatile memory for at least a first portion of a first sync interval, a first version of a file that is not modifiable during the at least the first portion of the first sync interval. The method also includes storing, in volatile memory for at least a second portion of the first sync interval, a second version of the file that is modifiable during the at least the second portion of the first sync interval. The method also includes subsequent to the first sync interval, replacing in nonvolatile memory, a third version of the file with the first version of the file stored in volatile memory. Further, the method includes marking the second version of the file as not modifiable during at least a first portion of a second sync interval.

At least one technological advantage of the disclosed techniques is that a device is able to access a valid version of a file stored in volatile memory after a system failure. In particular, even if one version of a file stored in volatile memory is invalid, the disclosed techniques enable the device to maintain a version of the file that was written to nonvolatile memory and is more likely to remain valid after system failure. The device is therefore able to avoid losses of data that would otherwise become invalid during system failures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
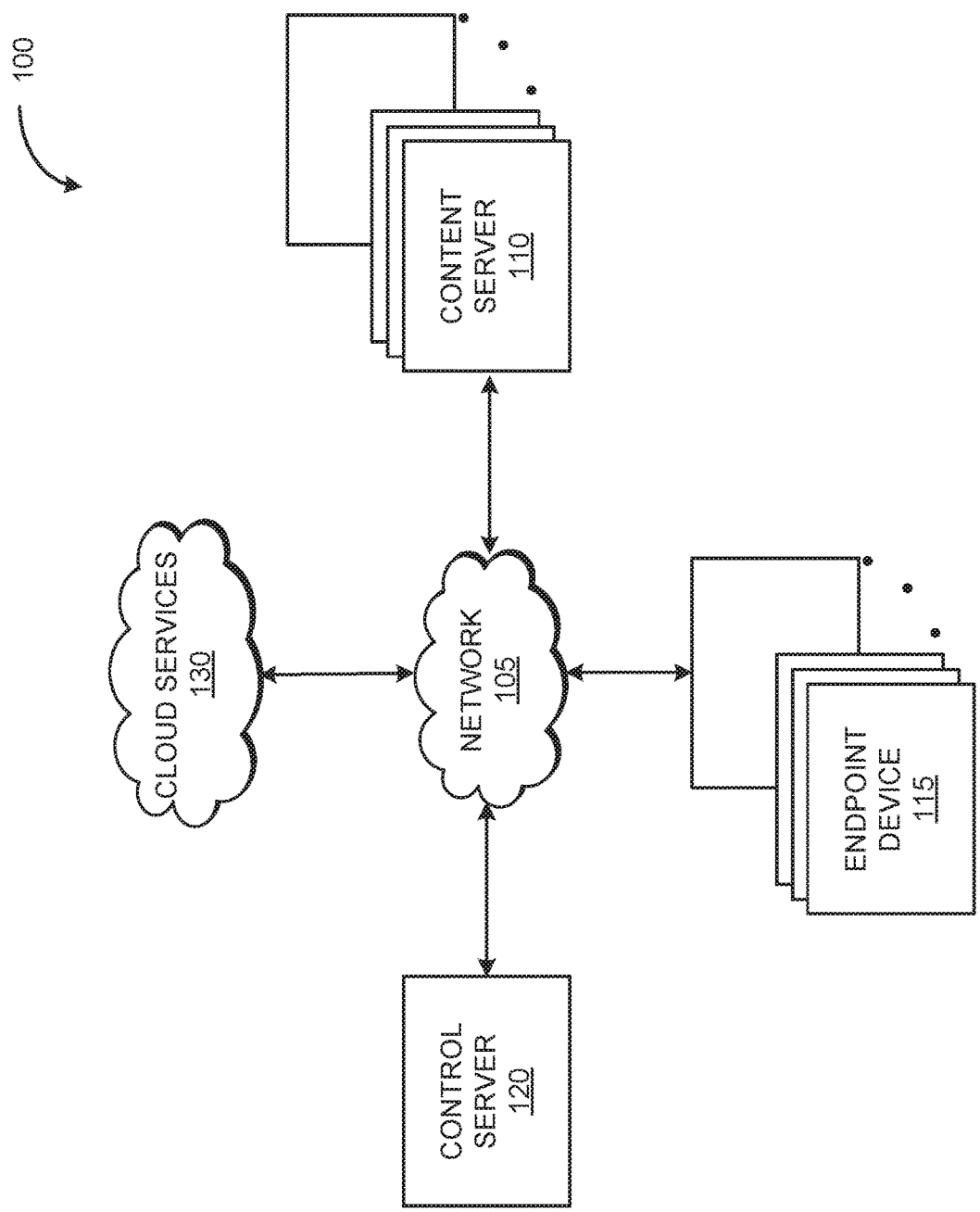
FIG. 1 illustrates a network infrastructure configured to implement one or more aspects of the present invention.

In the following description, numerous specific details are set forth to provide a more thorough understanding of the present invention. However, it will be apparent to one of skilled in the art that the present invention may be practiced without one or more of these specific details.

Overview

A video streaming service provides high-quality content to viewers by maintaining licenses for a content item that a viewer is streaming. The video streaming service also enhances the user's experience by personalizing the interface and/or playback when the user is browsing and playing content. The user's endpoint device (e.g., set-top box, laptop, mobile phone, etc.) maintains and updates secure application data that relates to an individual user and to a specific content item. During playback of a content item, the endpoint device stores and updates the secure application data in a secure data cache. For example, a secure data cache stores a single manifest file that stores data about the other files included in the secure data cache. However, when the endpoint device experiences a system failure, such as a crash due to a power loss, contents of the secure data cache become corrupt and/or become invalid. Prior art techniques would have the endpoint device reacquire a backup version of the secure application data from another device. One drawback of such an approach is that the request generated by the endpoint device unexpectedly increases loads on servers that maintain the backup secure application data. Thus, prior art techniques to do not properly account for additional requests for backup data by the endpoint device. In contrast, the disclosed techniques enable an endpoint device to recover from a system failure by maintaining multiple versions of secure files in a way that a version of the file is stored in nonvolatile memory. The endpoint device can therefore recover the secure files from volatile memory instead of requesting the files from other servers, enhancing the effectiveness of the device and the network infrastructure.

In various embodiments, an endpoint device periodically syncs a file stored in volatile memory to nonvolatile memory. In the periods between successive syncs, the endpoint device continually updates the file and stores new versions of the file in volatile memory. The endpoint device maintains within volatile memory a file directory for the file that includes multiple versions of the file that were created both before the previous sync and after the previous sync.

The file directory includes an oldest version of the file that was created before the previous sync. The oldest file version is likely to have been successfully written to nonvolatile memory. The file directory also includes a newest version of the file that was most-recently written to volatile memory. The newest file version is least likely to have been successfully written to nonvolatile memory. The file directory also includes a candidate version of the file. The candidate file version is the second most-recent version of the file. The endpoint device will write the candidate file version to nonvolatile memory during the next sync. As more recent versions of the file are written to volatile memory, the endpoint device deletes some of the older file versions from the file directory.

When the endpoint device subsequently experiences a system failure, the endpoint device attempts to access a valid version of the file from volatile memory, starting with the newest file version and continuing until reaching the oldest file version. The oldest version of the file is most likely to be valid because the oldest file version was created before the most recent sync and likely was written to nonvolatile memory. Because the oldest version of the file was likely written to nonvolatile memory, the oldest version of the file is therefore most likely to remain valid after a system failure. The endpoint device can then access a valid version of the file from volatile memory.

Advantageously, the endpoint device that employs the disclosed file versioning technique to write to its secure data cache addresses various limitations of conventional devices that use a secure data cache. More specifically, conventional endpoint devices do not maintain multiple versions of secure files in the secure data cache and, consequently, cannot access valid versions of the secure files after system failure. As a result, conventional endpoint devices must reacquire backup versions of the invalid secure files from other devices in the network infrastructure, causing unexpected loads on other devices in the network. By contrast, the endpoint device that employs the disclosed file versioning technique maintains a version of the secure data file in volatile memory that likely remains valid after system failure. The endpoint device can quickly access secure files from the secure data cache without reacquiring the secure files from another device.

Further, because versions of the secure files are valid after a system failure, the endpoint device does not experience a complete loss of data in the secure data cache due to one or more secures file becoming invalid. A video service provider may use endpoint devices that employ the disclosed file versioning technique to prepare for system failures due to occurrences like power loss.

Network Infrastructure

FIG. 1 illustrates a network infrastructure 100, according to various embodiments of the invention. As shown, the network infrastructure 100 includes content servers 110, control server 120, and endpoint devices 115, each of which are connected via communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), and/or any other technically-feasible computing platform that has network connectivity and is capable of presenting content, such as text, images, audio, and/or video content, to a user.

Each content server 110 could include, for example, a web server, a database (DB), and/or a server application configured to communicate with control server 120 to determine the availability and location of various files that are tracked and managed by control server 120. In various embodiments, each content server 110 may further communicate with cloud services 130 and one or more other content servers 110 in order to "fill" each content server 110 with copies of various files. In addition, content servers 110 may respond to requests for files received from one or more endpoint devices 115. The files may then be distributed from content server 110, or via a broader content distribution network (CDN). In some embodiments, content servers 110 enable a user to authenticate his or her identity (e.g., using a username and password) in order to access files stored on content servers 110. Although only one control server 120 is shown in FIG. 1, in various embodiments, multiple control servers 120 (e.g., content server 120-1, 120-2, etc.) may be implemented to track and manage files.

In various embodiments, cloud services 130 may include an online storage service (OSS) (e.g., Amazon® Simple Storage Service, Google® Cloud Storage, etc.) in which a catalog of thousands or millions of files is stored and/or accessed in order to fill content servers 110. Cloud services 130 also may provide computing and/or other processing services. Although only one cloud service 130 is shown in FIG. 1, in various embodiments, multiple cloud services 130 (e.g., cloud service 130-1, 130-2, etc.) may be implemented.

Figure 2:
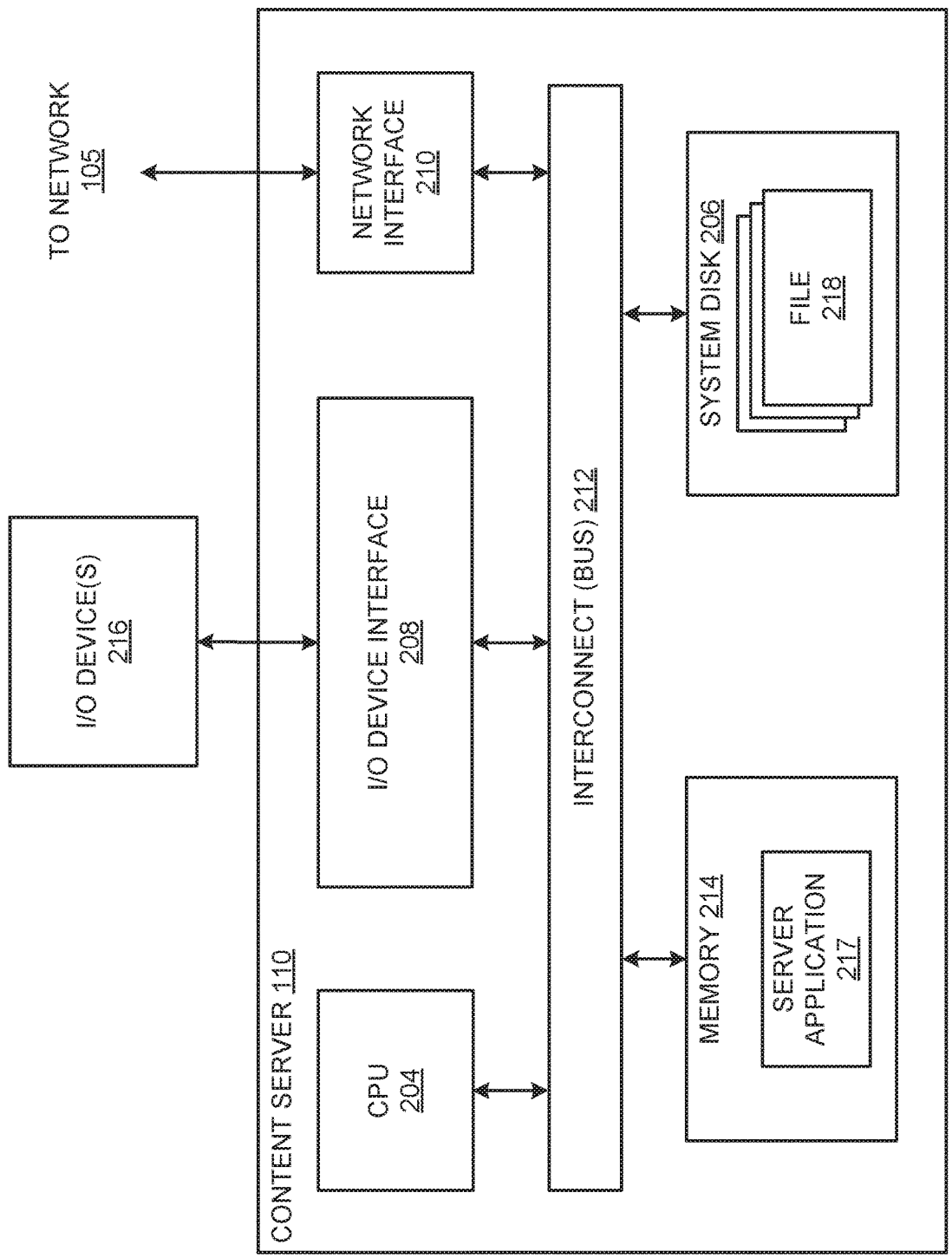
FIG. 2 is a more detailed illustration of the content server of FIG. 1, according to various embodiments of the present invention.

FIG. 2 is a more detailed illustration of content server 110 of FIG. 1, according to various embodiments of the present invention. As shown, content server 110 includes, without limitation, central processing unit (CPU) 204, system disk 206, input/output (I/O) device interface 208, network interface 210, interconnect (bus) 212, and system memory 214.

CPU 204 is configured to retrieve and execute programming instructions, such as server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O device interface 208, network interface 210, and system memory 214. I/O device interface 208 is configured to receive input data from one or more I/O devices 216 and transmit the input data to CPU 204 via interconnect 212. For example, the one or more I/O devices 216 may include one or more buttons, a keyboard, a mouse, and/or other input devices. I/O device interface 208 is further configured to receive output data from CPU 204 via interconnect 212 and transmit the output data to the one or more I/O devices 216.

System disk 206 may include one or more hard disk drives (HDDs), solid-state storage devices (SSDs), and/or similar storage devices. System disk 206 is configured to store nonvolatile data, such as one or more files 218 (e.g., audio files, video files, subtitles, application files, software libraries, etc.). Files 218 can then be retrieved by one or more endpoint devices 115 via network 105. In some embodiments, network interface 210 is configured to operate in compliance with one or more communications standards, such as the Ethernet standard, the Bluetooth standard, and/or one or more wireless communication standards.

System memory 214 includes server application 217, which configures content server 110, to service requests received from endpoint device 115 and other content servers 110. For example, the service request could be for one or more files 218. When server application 217 receives a service request for a specific file, server application 217 retrieves the corresponding file 218 from system disk 206 and transmits file 218 to endpoint device 115 and/or content server 110 via network 105.

File 218 could, for example, be one of a plurality of digital items, such visual content items like videos and/or still images. Similarly, file 218 could be one of a plurality of textual content items associated with one or more visual content items, such as movie metadata. In various embodiments, file 218 may be a one of a plurality of secure application data items associated with one or more content items and/or applications being executed by content server 110, control server 120, and/or endpoint server 115.

Figure 3:
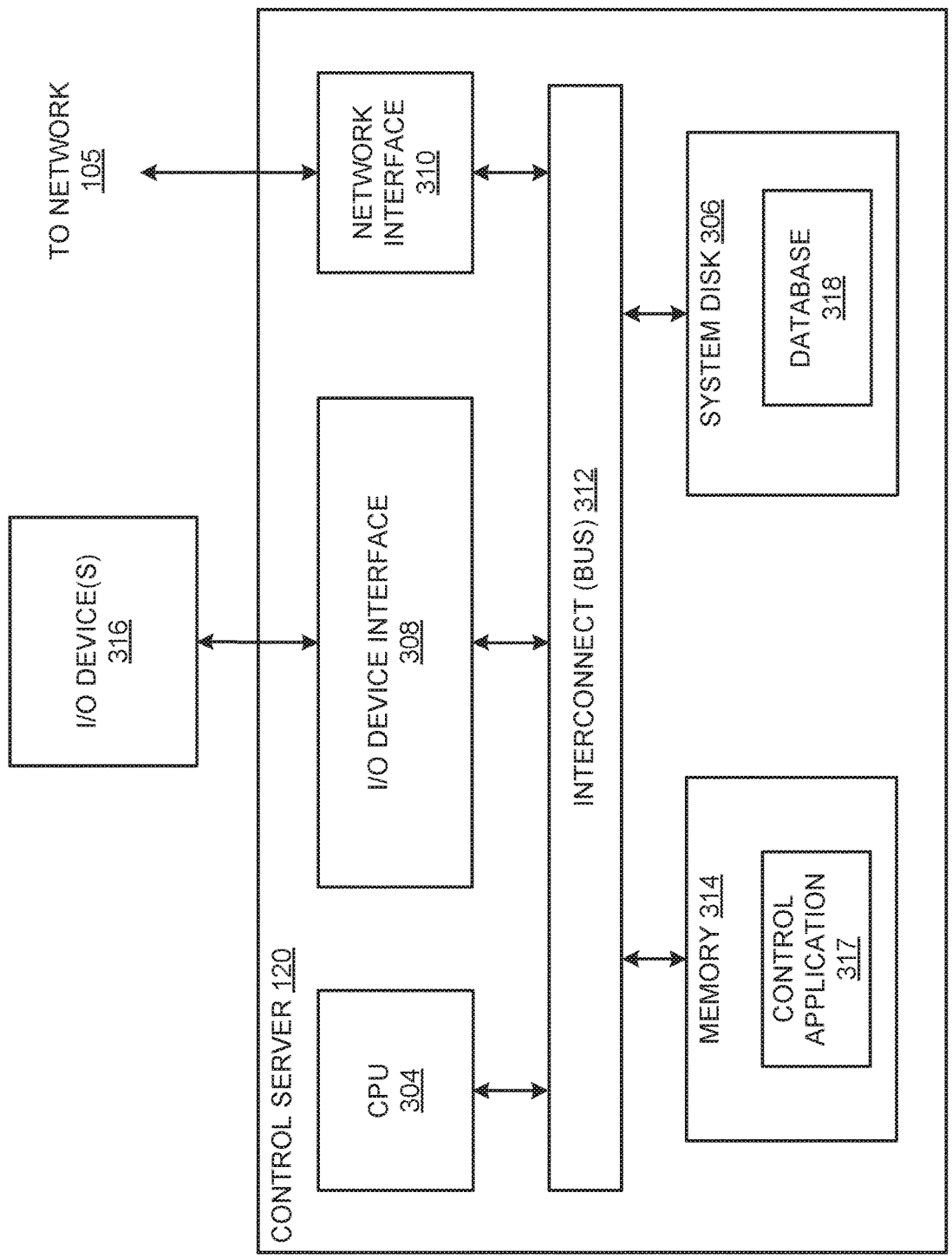
FIG. 3 is a more detailed illustration of the control server of FIG. 1, according to various embodiments of the present invention.

FIG. 3 is a more detailed illustration of control server 120 of FIG. 1, according to various embodiments of the present invention. As shown, control server 120 includes, without limitation, CPU 304, system disk 306, I/O device interface 308, network interface 310, interconnect 312, and system memory 314.

CPU 304 is configured to retrieve and execute programming instructions, such as control application 317, stored in system memory 314. Similarly, CPU 304 is configured to store application data (e.g., software libraries) and retrieve application data from system memory 314 and/or database 318 that is stored in system disk 306. Interconnect 312 is configured to facilitate transmission of data between CPU 304, system disk 306, I/O device interface 308, network interface 310, and system memory 314. I/O device interface 308 is configured to transmit input data and output data between the one or more I/O devices 316 and CPU 304 via interconnect 312. In various embodiments, system disk 306 may include one or more hard disk drives, solid state storage devices, etc. In various embodiments, system disk 206 (shown in FIG. 2) is configured to store database 318 that stores information associated with one or more content servers 110, cloud services 130, and/or files 218.

System memory 314 includes control application 317 configured to access information stored in database 318 and process the information to determine the manner in which specific files 218 will be replicated across content servers 110 included in network infrastructure 100. Control application 317 may further be configured to receive and analyze performance characteristics associated with one or more content servers 110 and/or endpoint devices 115.

Figure 4:
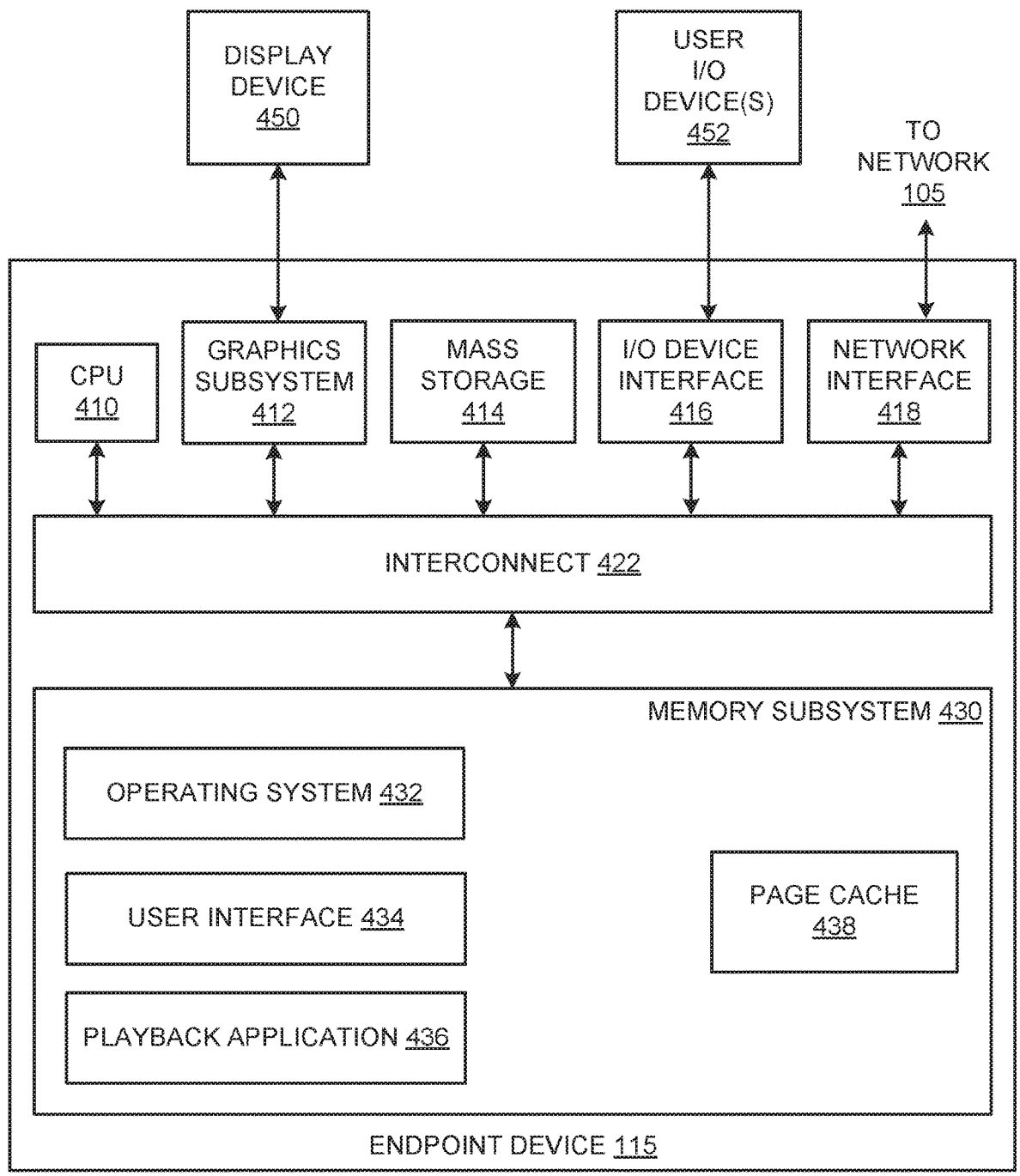
FIG. 4 is a more detailed illustration of the endpoint device of FIG. 1, according to various embodiments of the present invention.

FIG. 4 is a more detailed illustration of endpoint device 115 of FIG. 1, according to various embodiments of the present invention. As shown, endpoint device 115 may include, without limitation, CPU 410, graphics subsystem 412, mass storage unit 414, I/O device interface 416, network interface 418, interconnect 422, and memory subsystem 430.

In some embodiments, CPU 410 is configured to retrieve and execute programming instructions stored in memory subsystem 430. Similarly, CPU 410 is configured to store and retrieve application data (e.g., software libraries) residing in the memory subsystem 430. Additionally or alternatively, CPU 410 is configured to store and retrieve data, including content items and/or application data, from mass storage unit 414. Interconnect 422 is configured to facilitate transmission of data, such as programming instructions and application data, between the CPU 410, graphics subsystem 412, mass storage unit 414, I/O devices interface 416, network interface 418, and memory subsystem 430.

Graphics subsystem 412 is configured to generate frames of video data and transmit the frames of video data to display device 450. In various embodiments, graphics subsystem 412 may be integrated, along with CPU 410, into an integrated circuit (IC). Display device 450 may comprise any technically-feasible means for generating an image for display. For example, display device 450 could be fabricated using liquid crystal display (LCD) technology, cathode-ray tube technology, and/or light-emitting diode (LED) display technology.

Mass storage unit 414 can include, for example, a hard disk drive and/or flash-memory storage drive, and is configured to store nonvolatile data. For example, mass storage unit 414 could store one or more files 218, such as content items and/or application data. In various embodiments, endpoint device 115 may copy one or more files 218 stored in memory subsystem 430 (e.g., secure application data) to mass storage unit 414.

Input/output (I/O) device interface 416 is configured to receive input data from user one or more I/O devices 452 and transmit the input data to CPU 410 via interconnect 422. For example, user I/O device 452 may comprise one of more buttons, a keyboard, and a mouse or other pointing device. In various embodiments, I/O device interface 416 also includes an audio output unit configured to generate an electrical audio output signal. In such instances, user I/O device 452 may include an audio output device, such as headphones and/or a loudspeaker, configured to generate an acoustic output in response to the electrical audio input signal. Additionally or alternatively, display device 450 may include the loudspeaker. Examples of suitable devices known in the art that can display video frames and generate an acoustic output include televisions, smartphones, smartwatches, electronic tablets, etc.

Network interface 418 is configured to transmit and receive packets of data via network 105. In some embodiments, network interface 418 is configured to communicate using at least one of the Ethernet standard, the Bluetooth standard, and/or one or more wireless communication standards. Network interface 418 is coupled to CPU 410 via interconnect 422.

Memory subsystem 430 includes programming instructions and application data. In various embodiments, memory subsystem may include operating system 432, user interface 434, playback application 436, and/or page cache 438. Operating system 432 performs system management functions, such as managing hardware devices including graphics subsystem 412, mass storage unit 414, I/O device interface 416, and network interface 418. Operating system 432 also provides process and memory management models for user interface 434, playback application 436, and page cache 438. For example, endpoint device 115 may execute operating system 432 to write data to page cache 438 and/or sync data included in page cache 438 to mass storage unit 414.

User interface (UI) 434, for example, a graphical user interface (GUI) employing a window-and-object metaphor, provides a mechanism for user interaction with endpoint device 115. Persons skilled in the art will recognize the various operating systems 432 and/or user interfaces 434 that are suitable for incorporation into endpoint device 115. Playback application 436 is configured to request and/or receive content (e.g., one or more files 218) from content server 110 via network interface 418. Further, playback application 436 is configured to interpret the content and present the content via display device 450 and/or user I/O devices 452.

Page cache 438 is a portion of volatile memory that stores files 218, such as content items and/or application data (e.g., secure application data, metadata, etc.). In various embodiments, page cache 438 may correspond to a section of nonvolatile memory. In such instances, endpoint device 115 may sync data initially written volatile memory by writing the data to the corresponding section of nonvolatile memory. For example, page cache 438 may correspond to a section of mass storage unit 414. In such instances, endpoint device 115 then reads and/or writes files 218 to page cache 438 in lieu of accessing and/or files 218 directly in mass storage unit 414. Endpoint device could then sync data between page cache 438 and mass storage unit 414 so that copies of data are stored in both page cache 438 and mass storage unit 414.

File Versioning to Protect Against File Corruption

In some instances, endpoint device 115 may initially store a specific file by writing file 218 as volatile data into page cache 438 before writing file 218 as nonvolatile data in mass storage unit 414. However, in some instances, endpoint device 115 may not write file 218 to nonvolatile memory before experiencing a system failure. In such instances, the content of file 218 that is stored in page cache 438 may become corrupted and/or completely lost. When endpoint device 115 subsequently attempts to access file 218 from page cache 438, endpoint device 115 may no longer be able to access a valid version of file 218.

For example, when endpoint device 115 experiences power loss before file 218 is written from page cache 438 to mass storage unit 414, the contents of file 218 in page cache 438 could become corrupt and/or contents of file 218 could become lost (e.g., the data contents of the file 218 is zero-length). When endpoint device 115 subsequently attempts to access file 218, endpoint device 115 may instead receive an error. In instances when file 218 includes secure application data, the entire contents of page cache 438 may become invalid as well.

To address this problem, endpoint device 115 employs a file versioning technique to store multiple versions of file 218 in a manner that ensures that at least one file version that is stored in volatile memory has been written to nonvolatile memory. In particular, the technique uses a sync function to periodically write a file version from page cache 438 to mass storage unit 414. In the periods between successive syncs, endpoint device 115 may periodically update file 218 with one or more new file versions. In such instances, endpoint device 115 stores multiple file versions of the in page cache 438.

The file versions stored in page cache 438 includes a file version designated as an oldest file version that was created before the previous sync and is likely to have been successfully written to nonvolatile memory. Page cache 438 also stores a file version designated as a newest file version that is the least likely to have been successfully written to nonvolatile memory. Further, page cache 438 stores a file version designated as a candidate file version that is the second most-recent version and is the file version that endpoint device 115 will write to nonvolatile memory during the next sync. As more file versions are written to page cache 438, endpoint device 115 updates the designations of the file versions stored in page cache 438. For example, endpoint device 115 designates a newly-written file version as the newest file version, while endpoint device 115 designates the previous file version (formerly designated as the newest file version) as the candidate file version. Upon updating the designations, endpoint device 115 marks the remaining file versions for deletion.

When endpoint device 115 experiences a failure, such as a crash and/or a power loss, endpoint device 115 attempts to access a valid file version from page cache 438, starting with the file version designated as newest file version. When the newest file version is determined to be invalid, endpoint device 115 then attempts to access the file version designated as the candidate file version, then the file version designated as oldest file version. In particular, because at least one file version (e.g., the oldest file version) was created before the previous sync was performed, it is likely that at least one file version has been successfully written to nonvolatile memory and remains valid after the system failure. Endpoint device 115 can therefore access a valid file version from page cache 438 after system failure.

Figure 5:
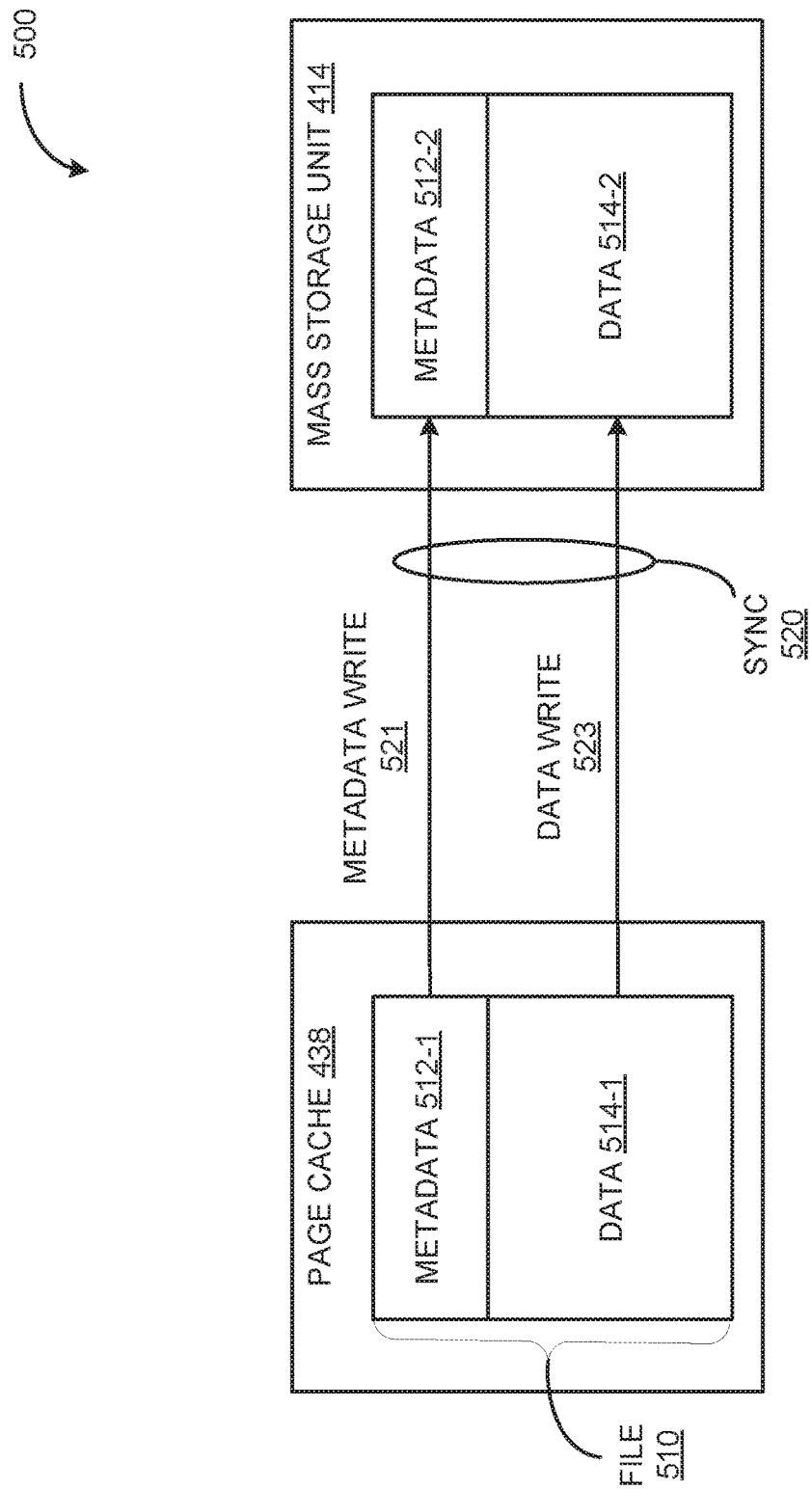
FIG. 5 illustrates a technique of syncing data between volatile memory and nonvolatile memory included in the endpoint device of FIG. 1, according to various embodiments of the present invention.

FIG. 5 illustrates a technique of syncing data between volatile memory and nonvolatile memory included in the endpoint device of FIG. 1, according to various embodiments of the present invention. As shown, endpoint device 500 includes page cache 438 and mass storage unit 414.

In operation, endpoint device 500 writes file 510 from volatile memory to nonvolatile memory by performing one or more writes. For example, endpoint device 500 could perform sync 520 to write at least part of file 510 from page cache 438 to a portion of mass storage unit 414. In various embodiments, endpoint device 500 periodically performs successive syncs 520 (e.g., 520-1, 520-2, etc.) where endpoint device 500 syncs at least one version of file 510 to mass storage unit 414.

File 510 is data that is initially written to volatile memory. In various embodiments, file 510 can be secure application data associated with one or more applications executed by endpoint device 115 and/or one or more content items being accessed by endpoint device 115. For example, when endpoint device 115 executes operation system 432, user interface 434, and/or playback application 436, endpoint device 115 may generate file 510 as a ramshadow file that includes secure application data. The secure application data could include, for example, a message security layer (MSL) token associated with a user, or a secure stop identifier associated with an active playback of a content item.

In some embodiments, endpoint device 115 may store file 510 as an inode that includes a metadata portion 512-1, a data portion 514-1, and/or a pointer to data portion 514-1. For example, when file 510 is an inode that stores secure application data, metadata portion 512-1 may store checksum information, application state information, and/or other information about the object. Similarly, data portion 514-1 includes the object itself, and/or specific data that could be frequently updated by endpoint device 115. In some embodiments, file 510 can be one of a plurality of digital items, such visual content items like videos and/or still images. Similarly, file 510 may be one of a plurality of textual content items associated with one or more visual content items, such as movie metadata.

Endpoint device 115 writes one or more portions of file 510 from volatile memory to nonvolatile memory by executing one or more write functions 520-523. For example, endpoint device 115 executes sync function 520 (e.g., "fsync( )") by writing all of file 510 from page cache 438 to mass storage unit 414. Additionally or alternatively, endpoint device 115 may execute metadata write 521 by writing metadata portion 512-1 to mass storage device 414 as nonvolatile metadata portion 512-2. Similarly, endpoint device 115 may execute data write 523 by writing data portion 514-1 to mass storage unit 414 as data portion 514-2.

In some embodiments, endpoint device 115 may perform metadata write 521 on metadata portion 512-1 before performing data write 523 on data portion 514-1. In such instances, file 510 may be in a state where metadata portion 512-1 has been successfully written to mass storage unit 414 as nonvolatile metadata portion 512-2, but data portion 514-1 has not been successfully written to mass storage unit 414. If endpoint device 115 experiences system failure while file 510 is in this state, data portion 514-1 may become zero length and may cause file 510 to become invalid. When endpoint device 115 subsequently attempts to access file 510, endpoint device 115 will be unable to access file 510, as file 510 will no longer have any contents in data portion 514-1.

Figure 6:
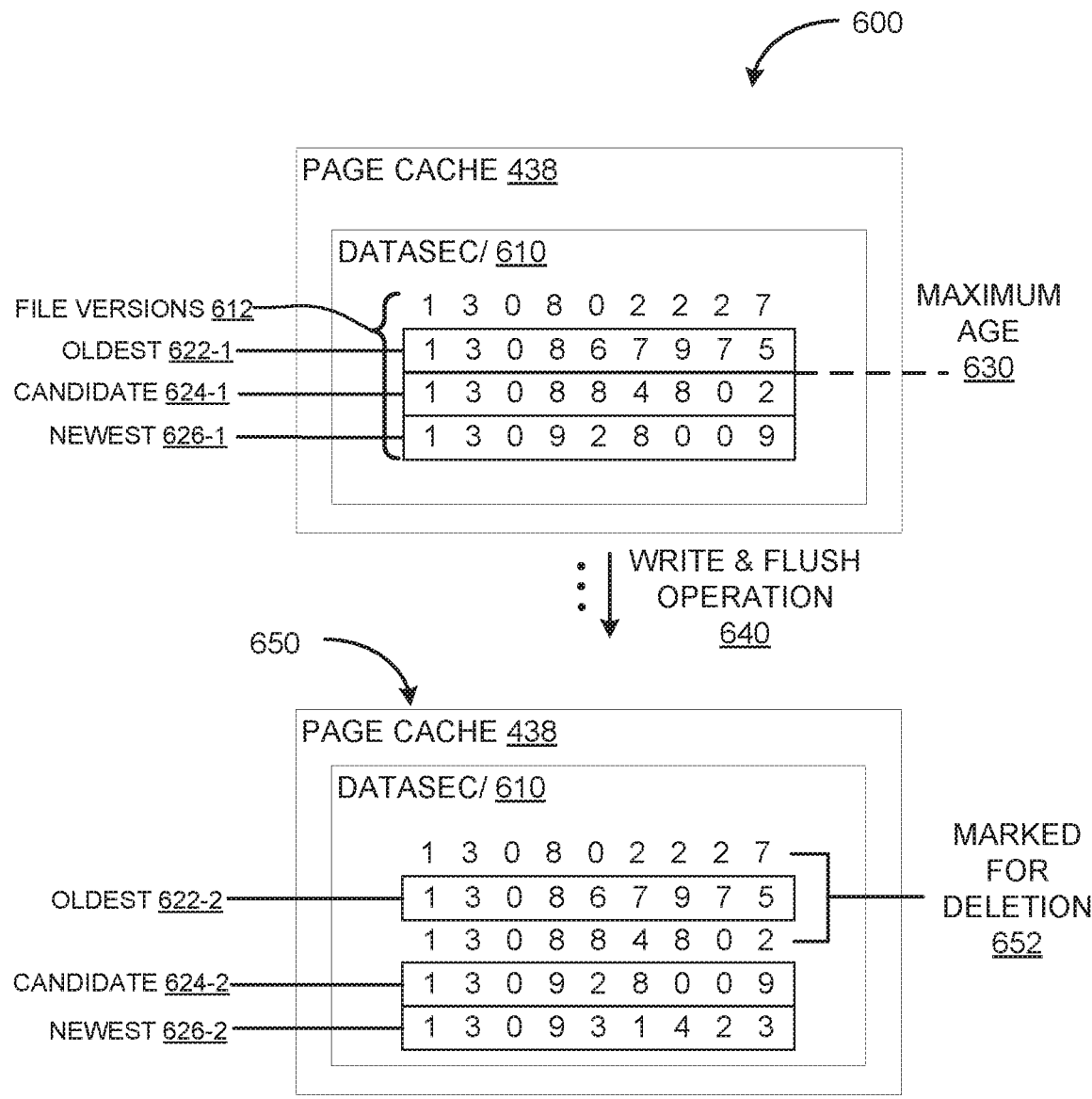
FIG. 6 illustrates a technique for writing versions of a file in a page cache included in the endpoint device of FIG. 1, according to various embodiments of the present invention.

FIG. 6 illustrates a technique for writing versions of a file in a page cache included in the endpoint device of FIG. 1, according to various embodiments of the present invention. As shown, page cache states 600, 650 include a file directory 610 and a set of file versions 612.

In operation, page cache 438 stores a file directory 610 for a given file 510. File directory 610 stores a set of file versions 612 of file 510. One or more specific file versions 612 (e.g., 612-2, 612-3, 612-4) are assigned specific designations 622-626. When endpoint device 115 performs write and flush operation 640 to generate a new file version 612-5, endpoint device 115 updates the designations 622-626 based on the new file version 612-5 being included in file directory 610. In various embodiments, endpoint device may change page cache states 600, 650 multiple times before performing sync 520 and/or data write 523 to write one or more file versions to mass storage unit 414.

Page cache 438 includes file directory 610 for file 510 that includes multiple file versions 612. For example, file directory 610 for a file 510 named "DATASEC" includes four file versions 612 (e.g., 612-1, 612-2, 612-3, 612-4). Each file version 612 is added to file directory 610 when endpoint device 500 modifies one or more of metadata portion 512-1 and/or data portion 514-1 of file 510.

In various embodiments, file directory 610 may maintain an ordered list of file versions 612. For example, endpoint device 115 may generate file version 612-1 as a version-timestamped file, where the name for file version 612-1 based on a system clock value (e.g., a value based on the "MONOTONIC_RAW" system clock value) of endpoint device 115 at the time first file version 612-1 is created. In such instances, file directory 610 may maintain an ascending list of file versions 612, where more-recent file versions (e.g., second file version 612-2) have higher numerical values.

In various embodiments, endpoint device 115 may determine the relative age of file versions 612 by comparing the values of file version names. For example, endpoint device 115 could determine that file version 612-3 is newer than file version 612-1 by determining that file name "130884802" is a greater numerical value than "13080227". In some embodiments, when generating version-timestamped files, endpoint device 115 may determine that the value represented by the file is larger than the current system clock value. For example, when the system reboots after generating a file version 612-4, the system clock resets and the file version could have a name whose numerical value is larger than current system clock value. In such instances, endpoint device 115 may correct the file version by renaming the file version to a have a numerical value that is based on the current clock value (e.g., a numerical value lower than the current clock value).

File directory 610 maintains one or more designations 622-626 that are applied to individual file versions 612 stored in file directory 610. For example, after performing first sync 520-1, file directory 610 includes a list of four file versions 612 where endpoint device 115 applies designations to three of the file versions 612.

Endpoint device 115 could apply the designation of oldest file version 622-1 to file version 612-2. Oldest file version 622-1 designates a file version 612-2 as a file that was created before maximum age 630, which corresponds to the time of first sync 520-1. In some embodiments, endpoint device 115 applies the designation of oldest file version 662-1 to the most-recent file version before maximum age 630, while an older file version 612-1 is undesignated. Because file version 612-2 is the most-recent file before maximum age 630, it is likely that file version 612-2 was synced to nonvolatile memory during the first sync 520-1.

In various embodiments, endpoint device 115 also designates file version 612-3 as candidate file version 624-1 in file directory 610. The designation of candidate file version 624-1 for file version 612-3 specifies that file version 612-3 was created after maximum age 630. The file version associated with the designation of candidate file version 624-1 is the version of file 510 that endpoint device 115 will write to mass storage unit 414 during the next sync (e.g., second sync 520-2 and/or second data write 523-2). Additionally or alternatively, endpoint device 115 designates file version 612-4 as newest file version 626-1 in file directory 610. When endpoint device 115 generates new file version 612-4, page cache 438 stores the newly-created file version 612-4 in file directory 610 and designates file version 612-4 as newest file version 626-1.

Endpoint device 115 performs one or more write and flush operations 640 (e.g., "flush( )") by modifying metadata portion 512-1 and/or data portion 514-1 included in the most-recent file version 612-4. Endpoint device 115 causes page cache to change state from an initial state 600 to a second state 650 by storing file 510 that includes the modified metadata portion 512-1 and/or data portion 514-1 as a new file version 612-5. Once page cache 438 is in second state 650, endpoint device 115 scans the index of file directory 610 and update designations 622-626 applied to the file versions 612 included in file directory 610.

For example, after adding file version 612-5, endpoint device 115 could update designations 622-626 within file directory 610. For example, endpoint device 115 could update designations 622-626 so that file version 612-5 is designated as newest file version 626-2, file version 612-2 remains designated as oldest file version 622-2, and file version 612-4, which was previously designated as newest file version 626-1, is updated so as to be designated as candidate file version 624-2. In some embodiments, updating the one or more designations 622-626 also specifies which file versions 612 are to be retained in file directory 610. For example, endpoint device 115 could mark for deletion 652 one or more file versions 612 (e.g., file version 612-1, file version 612-3) that are not associated with any designation 622-626. In such instances, endpoint device 115 could subsequently remove the marked file versions 612-1, 612-3 from file directory 610.

In various embodiments, endpoint device 115 may sync at least one file version 612-5 to mass storage unit 414. For example, endpoint device 115 could establish a sync interval as a set amount of time after the first sync 520-1. Endpoint device 115 could then determine whether the sync interval has ended and, if so, perform a second sync 520-2. In various embodiments, endpoint device 115 may establish the sync interval by setting a sync interval threshold, and may then determine that the sync interval has ended by comparing the time elapsed since first sync 520-1 to sync interval threshold. For example, endpoint device 115 could initially set a sync interval, which specifies the time period between successive syncs 520, to 60 seconds. Accordingly, endpoint device 115 could set the sync interval threshold to a time corresponding to 60 seconds past the time of the first sync 520-1. In some embodiments, the interval threshold may be a value that is based on the value of maximum age 630.

When endpoint device 115 determines that the sync interval has elapsed, endpoint device 115 syncs at least one file version 612 to nonvolatile memory. For example, at the end of the sync interval, endpoint device 115 can perform the second sync 520-2 by writing file version 612-4, designated as candidate file version 624-2, to mass storage unit 414, where a copy of file version 612-4 is stored as nonvolatile data. In various embodiments, the copy of file version 612-4 in mass storage unit 414 overwrites any previous file versions of file 510 that were stored in mass storage unit 414. Additionally or alternatively, endpoint device 115 may perform a metadata write 521 of file version 612 to mass storage unit 414 before the sync interval ends. In such instances, endpoint device 115 may sync file version 612-4 to mass storage unit 414 by performing a data write 523 of the data portion of file version 612-4 after the sync interval ends.

Figure 7:
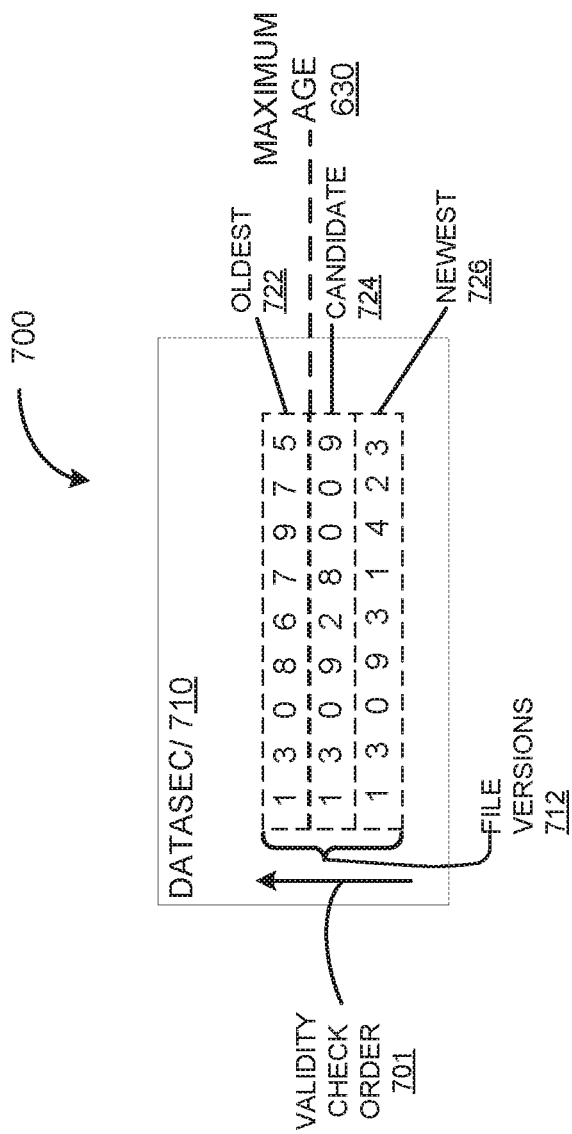
FIG. 7 illustrates a technique for accessing a valid version of a file from a page cache included in the endpoint device of FIG. 1, according to various embodiments of the present invention.

FIG. 7 illustrates a technique for accessing a valid version of a file from a page cache 438 included in the endpoint device of FIG. 1, according to various embodiments of the present invention. As shown, page cache 700 includes file directory 710. File directory 710 includes a list of file versions 712.

In operation, endpoint device 115 attempts to access file 510 from page cache after rebooting. For example, after endpoint device 115 writes one or more file versions 712 to file directory 710, endpoint device 115 could experience a system failure, such as a system crash due to a power outage. After returning from the system failure, endpoint device 115 could then attempt to access at least one file version 712 of file 510 from file directory 710. In some embodiments, one or more file versions 712 may have become corrupt and/or the data may have been invalidated due to the system failure.

In various embodiments, when endpoint device 115 accesses a file version 712 from file directory 710, endpoint device 115 starts by attempting to access the most-recent file version 712-3, which is designated as newest file version 726. In such instances, endpoint device 115 may use validity check order 701, which specifies the order in which endpoint device 115 accesses and checks other file versions 712-2, 712-1 for validity when endpoint device 115 determines that file version 712-3 is invalid.

Endpoint device 115 performs a validity check (e.g., calling an "isValid( )" command) on an accessed file version 712-3 to determine whether the accessed file version 712-3 is valid. When endpoint device 115 determines that the accessed file version 712-3 is valid, endpoint device 115 can access the data portion 514-1 from page cache 438 and/or sync accessed file version 712-3 to mass storage unit 414. Otherwise, when endpoint device 115 determines that accessed file version 712-3 is not valid, endpoint device 115 accesses one of the remaining file versions 712-2, 712-1. In some embodiments, when endpoint device 115 does not find any file version 712 in page cache 438 that is valid, endpoint device 115 may determine that file 510 is in an error condition.

In some embodiments, when endpoint device 115 determines that accessed version 712-3 is valid, endpoint device 115 may sync the valid file version 712-3 to mass storage unit 414. For example, endpoint device 115 could perform a third sync 520-3 to write the accessed file version 712-3 to mass storage unit 414. In such instances, endpoint device could initially update the designations 722-726 for file directory 710 such that accessed file version 712-3 is designated as candidate file version 724. When endpoint device 115 subsequently performs the third sync 520-3, endpoint device 115 writes file version 712-3 to mass storage unit 414, where a copy of file version 712-3 is stored as nonvolatile data. In some embodiments, endpoint device 115 may immediately perform the third sync 520-3.

In some embodiments, endpoint device 115 may rename the valid file version to predate a timestamp associated with rebooting the system. For example, when endpoint device 115 reboots, operating system 432 could reset the system clock to "0." Endpoint device 115 could also set the maximum age 630 associated with a previous sync 520 to be associated with the reset system clock (e.g., setting maximum age to "000060000"). When endpoint device 115 subsequently determines that oldest file version 712 is valid and has a timestamp of "130867975," endpoint device 115 could rename oldest version 722 to a timestamp that predates the reset maximum age 630 (e.g., a timestamp of "0000500000").

Figure 8:
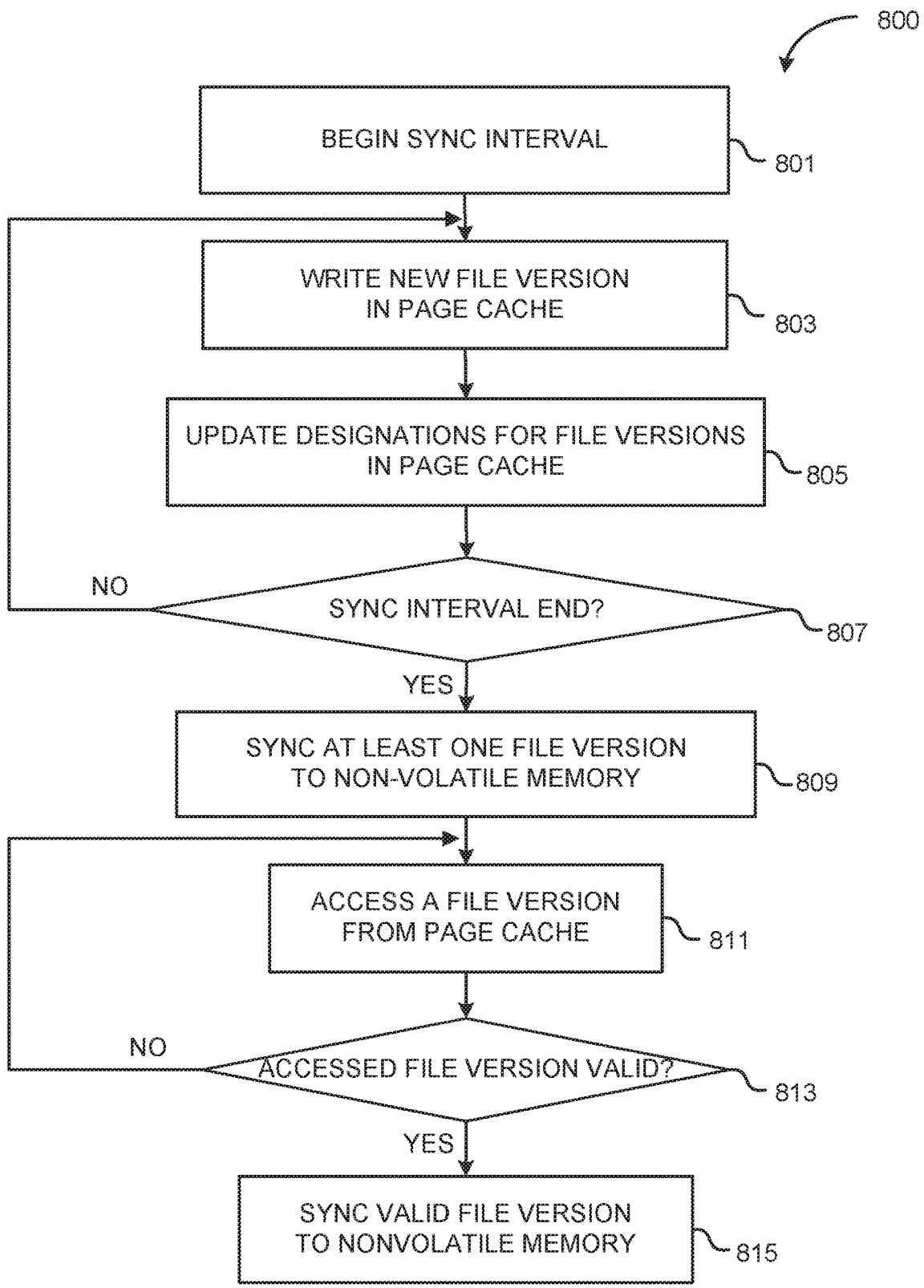
FIG. 8 sets for a flow diagram of method steps for storing versions of a file during a sync interval, according to various embodiments of the present invention.

FIG. 8 sets for a flow diagram of method steps for storing versions of a file during a writeback interval, according to various embodiments of the present invention. Although the method steps are described with reference to the systems of FIGS. 1-7, persons skilled in the art will understand that any system configured to implement the method steps, in any order, falls within the scope of the present invention.

As shown, method 800 begins at step 801, where endpoint device 115 begins a sync interval. Endpoint device 115 sets sync interval as a time period between successive syncs 520-1, 520-2 that are performed to write data into a section of nonvolatile memory. For example, endpoint device 115 may initially perform a first sync 520-1 that writes file 510 from page cache 438 to mass storage unit 414. Endpoint device 115 may then begin a first sync interval after executing the first sync 520-1 by scheduling a time to perform a second sync 520-2 of one or more files 510 to mass storage unit 414.

In various embodiments, endpoint device 115 may modify the length of the sync interval as a specified time after a write to nonvolatile memory. For example, the sync interval could initially be set to 5 seconds after the previous sync 520 and/or data write 523 (e.g., "dirty_writeback_centisecs=5"). Endpoint device 115 could change the value of the sync interval to 60 seconds ("dirty_writeback_centisecs=60"). During the 60-second interval, new versions of file 510 that are written to page cache 438 may not be synced to mass storage unit 414.

At step 803, endpoint device 115 writes a new file version in page cache 438. For example, endpoint device 115 could perform write and flush operation 640 within the sync interval after performing first sync 520. In some embodiments, endpoint device 115 may write multiple file versions 612 in page cache 438 instead of overwriting file 510. In such instances, page cache 438 may maintain file directory 610 for file 510 that includes multiple file versions 612 (e.g., version 612-1, version 612-2, etc.), which are added to file directory 610 as endpoint device 500 modifies data included in file 510. In various embodiments, file directory 610 may maintain an ordered list of file versions 612. For example, endpoint device 115 may name file version 612-1 of file 510 as a version-timestamped file based on a system clock value of endpoint device 115 at the time first file version 612-1 is created. In such instances, file directory 610 may maintain an ascending list of file versions 612, where more-recent file versions (e.g., second file version 612-2) have higher numerical values.

In various embodiments, endpoint device 115 maintains at least three file versions 612 in file directory 610. Additionally or alternatively, endpoint device 115 maintains one or more designations 622-626, where each designation 622-626 applies to a single file version 612 stored in file directory 610. For example, after performing first sync 520-1, page cache 438 designates second file version 612-2 as oldest file version 622-1 in file directory 610. Oldest file version 622-1 designates a specific file version 612-2 that was created before maximum age 630, which corresponds to the time of first sync 520-1.

In various embodiments, endpoint device 115 also designates file version 612-3 as candidate file version 624-1 in file directory 610. The designation of candidate file version 624-1 specifies that file version 612-3 was created after maximum age 630. Candidate file version 624-1 is the version of file 510 that endpoint device 115 will write to mass storage unit 414 during the next sync (e.g., second sync 520-2 and/or second data write 523-2). Additionally or alternatively, endpoint device 115 designates file version 612-4 as newest file version 626-1 in file directory 610. When endpoint device 115 generates a new file version 612-4 (e.g., performs write and flush operation 640), page cache 438 stores the newly-created file version 612-4 in file directory 610 and designates file version 612-4 as newest file version 626-1.

At step 805, endpoint device 115 updates the designations 622-626 associated with one or more file versions 612 stored in page cache 438. After endpoint device 115 performs write and flush operation 640 in step 801 to write new file version 612-5 into file directory 610, endpoint device 115 updates one or more designations 622-626 included in file directory 610.

For example, file directory 610 could initially designate file version 612-2 as oldest file version 622-1, file version 612-3 as candidate file version 624-1, and file version as newest file version 626-1. Upon adding a file version 612-5 via write and flush operation 640, endpoint device 115 could update designations 622-626 within file directory 610. For example, endpoint device 115 can update designations 622-626 so that file version 612-5 is designated as newest file version 626-2, file version 612-2 remains designated as oldest file version 622-2, and file version 612-4, which was previously designated as newest file version 626-1, is designated as candidate file version 624-2. In some embodiments, updating the one or more designations 622-626 also specifies which file versions 612 are to be retained in file directory 610. For example, endpoint device 115 one or more file versions 612 (e.g., file version 612-1, file version 612-3) that are not associated with any designation 622-626 can be marked for deletion 652. In such instances, endpoint device 115 could subsequently remove the marked versions 612-1, 612-3 from file directory 610.

At step 807, endpoint device 115 determines whether the sync interval has ended. In various embodiments, endpoint device 115 may determine whether the sync interval has ended by comparing the time elapsed since first sync 520-1 to an interval threshold. For example, when the sync interval is 60 seconds, endpoint device 115 could set the interval threshold to a time corresponding to 60 seconds past the time of the first sync 520-1. In some embodiments, the interval threshold is based on the value of maximum age 630. If endpoint device 115 determines that the sync interval has not ended, endpoint device 115 returns to step 803, where endpoint device 115 may write a new file version 612 in file directory 610. Otherwise, when endpoint device 115 determines that the sync interval has elapsed, endpoint device proceeds to step 809.

At step 809, endpoint device 115 syncs at least one file version 612 to nonvolatile memory. At the end of the sync interval, endpoint device 115 performs the second sync 520-2 by writing file version 612-4, designated as candidate file version 624-2, to mass storage unit 414, where a copy of file version 612-4 is stored as nonvolatile data. In various embodiments, the copy of file version 612-4 in mass storage unit 414 overwrites any previous versions of file 510 that were stored in mass storage unit 414. Additionally or alternatively, endpoint device 115 may perform a metadata write 521 of file version 612 to mass storage unit 414 before the sync interval ends. In such instances, endpoint device 115 may sync file version 612-4 to mass storage unit 414 by performing a data write 523 of the data portion of file version 612-4 after the sync interval ends.

At step 811, endpoint device 115 accesses a file version 712 that is stored in page cache 438. In various embodiments, endpoint device 115 may attempt to access file 510 from page cache after rebooting from a system failure. For example, after endpoint device 115 writes one or more file versions 712 to file directory 710, endpoint device 115 could experience a system failure, system crash due to a power outage. After returning from the system failure, endpoint device 115 could then attempt to access at least one file version 712 of file 510 from file directory 710. In some embodiments, one or more file versions 712 may have become corrupted and/or the data may have been invalidated due to the system failure.

In various embodiments, when endpoint device 115 accesses a file version 712 from file directory 710, endpoint device 115 starts by attempting to access the most-recent file version 712-3, which is designated as newest file version 726. In such instances, endpoint device 115 may use validity check order 701 to access and check other file versions 712-2, 712-1 for validity when endpoint device 115 determines that file version 712-3 is invalid.

At step 813, endpoint device 115 determines whether the accessed file version 712-3 is valid. For example, endpoint device 115 could perform a validity check (e.g., calling an "isValid( )" command) on accessed file version 712-3 to determine whether file version 712-3 is valid. When endpoint device 115 determines that the accessed file version 712-3 is valid, endpoint device 115 proceeds to step 815. Otherwise, when endpoint device 115 determines that accessed file version 712-3 is not valid, endpoint device 115 returns to step 811, where endpoint device 115 accesses one of the remaining file versions. In some embodiments, when endpoint device 115 does not find any valid file version in page cache 438, endpoint device 115 may determine that file 510 is in an error condition.

At step 815, endpoint device 115 optionally syncs the valid file version 712-3 to nonvolatile memory. When endpoint device 115 determines that the accessed file version 712-3 is valid, endpoint device 115 causes the accessed file version 712-3 to be synced to mass storage unit 414. For example, when endpoint device 115 determines that accessed file version 712-3 is valid, endpoint device 115 could update the designations 722-726 for file directory 710 in order to assign the designation of candidate file version 724 to accessed file version 712-3. When endpoint device 115 subsequently performs a third sync 520-3, endpoint device file version 712-3 to mass storage unit 414, where a copy of file version 712-3 is stored as nonvolatile data. In some embodiments, endpoint device 115 may immediately perform the third sync 520-3.

In sum, an endpoint device in a network infrastructure employs a file versioning technique to store multiple versions of a given file as volatile data in a page cache. During operation, the endpoint device periodically syncs the file by writing at least one version of the file from the page cache to a nonvolatile memory. In the period between successive syncs, the endpoint device periodically updates the file by storing new versions of the file in the page cache. The page cache maintains a file directory that applies at least three designations to various versions of the file. The three designations include an oldest file version, a candidate file version, and a newest file version.

The oldest file version designation is applied to a file version that was created before the previous sync was performed; the oldest file version is therefore likely to have been written to nonvolatile memory. The candidate file version designation is applied to the second most-recent file version and is the file version that the endpoint device will next write to nonvolatile memory. The newest file version designation is applied to the file version that was most recently written to the page cache and is the most likely to become invalid during a system failure. As the endpoint device writes more file versions to the page cache, the endpoint device updates the designations applied to file versions in the file directory. The newly-written file version is designated as the newest file version, while the second most-recent file version (formerly designated as the newest file version) is designated as the candidate file version. Upon updating the designations, the endpoint device marks the remaining, undesignated file versions for deletion.

When the endpoint device subsequently experiences a system failure, such as a crash and/or a power loss, the endpoint device attempts to access a valid file version from the page cache, starting with the newest file version. When the endpoint device determines that newest file version is invalid, the endpoint device then attempts to access the candidate file version, then the oldest file version from the file directory until the endpoint device successfully accesses a valid file version.

At least one technological advantage of the disclosed techniques is that a device is able to access a valid version of a file from volatile memory after a system failure, even if one version of a file stored in volatile memory is invalid. Because the page cache maintains at least one file version that was created before the previous sync, at least one version of the file likely remains valid after a system failure, and the device is likely able to access a valid file version from volatile memory. Accordingly, the device is able to avoid losses of data that would otherwise become invalid during system failures.

1. In one or more embodiments, a computer-implemented method comprises storing, in volatile memory for at least a first portion of a first sync interval, a first version of a file that is not modifiable during the at least the first portion of the first sync interval, storing, in the volatile memory for at least a second portion of the first sync interval, a second version of the file that is modifiable during the at least the second portion of the first sync interval, and subsequent to the first sync interval replacing, in nonvolatile memory, a third version of the file with the first version of the file stored in volatile memory, and marking the second version of the file as not modifiable during at least a first portion of a second sync interval.

2. The computer-implemented method of clause 1, further comprising storing in volatile memory for the at least a third portion of the first sync interval, a fourth version of the file that is modifiable during the at least the third portion of the first sync interval, and marking the second version of the file as not modifiable during at least the third portion of the first sync interval, where subsequent to the first sync interval, the second version of the file stored in volatile memory replaces the third version of the file in nonvolatile memory.

3. The computer-implemented method of clause 1 or 2, where storing the fourth version of the file comprises accessing the second version of the file, changing data included in the second version of the file to generate modified data, and storing the fourth version of the file that includes the modified data.

4. The computer-implemented method of any of clauses 1-3, further comprising, for at least the third portion of the first sync interval, marking the first version of the file for deletion.

5. The computer-implemented method of clauses 1-4, where volatile memory stores at least three versions of the file for at least the third portion of the first sync interval, wherein at least one version included in the at least three versions replaces the third version of the file in nonvolatile memory subsequent to the first sync interval.

6. The computer-implemented method of clauses 1-5, further comprising generating a first name for the first version of the file based on a value generated by a system clock.

7. The computer-implemented method of clauses 1-6, where the first version of the file includes a first set of data and a first set of metadata.

8. The computer-implemented method of clauses 1-7, where the file includes secure application data.

9. The computer-implemented method of clauses 1-8, where the secure application data includes at least one of a message security layer (MSL) token or a secure identifier.

10. In one or more embodiments, a device comprises a memory subsystem that stores one or more versions of a file, the memory subsystem comprising volatile memory and nonvolatile memory, and a processor coupled to the memory subsystem that stores in volatile memory for at least a first portion of a first sync interval, a first version of the file that is not modifiable during the at least the first portion of the first sync interval, wherein the first version of the file comprises an inode that includes a first set of data and a first set of metadata, storing in volatile memory for at least a second portion of the first sync interval, a second version of the file that is modifiable during the at least a second portion of the first sync interval, and subsequent to the first sync interval replacing in nonvolatile memory, a third version of the file with the first version of the file stored in volatile memory, and marking the second version of the file as not modifiable during at least a portion of a second sync interval.

11. The device of clause 10, further comprising storing in volatile memory for the at least a third portion of the first sync interval, a fourth version of the file that is modifiable during the at least the third portion of the first sync interval, and marking the second version of the file as not modifiable during the at least the third portion of the first sync interval, where subsequent to the first sync interval, the second version of the file stored in volatile memory replaces the third version of the file in nonvolatile memory.

12. The device of clause 10 or 11, further comprising replacing, in nonvolatile memory during the first sync interval, a second set of metadata included in the third version of the file with the first set of metadata.

13. The device of any of clauses 10-12, further comprising replacing, in nonvolatile memory subsequent to the first sync interval, a second set of data included in the third version of the file with the first set of data.

14. The device of any of clauses 10-13, where the first set of metadata includes a checksum of the first set of data.

15. The device of any of clauses 10-14, where the processor further generates a first name for the first version of the file based on a first clock value generated by a system clock.

16. The device of any of clauses 10-15, where the processor further compares a first value associated with the first name to a current value of the system clock, and when the first name is greater than the current value generates a second value that is less than the current value, generates a second name based on the second value, and renames the first version of the file with the second name.

17. In some embodiments, one or more non-transitory computer-readable media store instructions that, when executed by one or more processors, cause the one or more processors to perform the steps of storing, in volatile memory for at least a first portion of a first sync interval, a first version of a file including first secure application data that is not modifiable during the at least the first portion of the first sync interval, storing, in volatile memory for at least a second portion of the first sync interval, a second version of the file including second secure application data that is modifiable during the at least the second portion of the first sync interval, and subsequent to the first sync interval replacing in nonvolatile memory, a third version of the file including third secure application data with the first version of the file stored in volatile memory, and marking the second version of the file as not modifiable during at least a first portion of a second sync interval.

18. The one or more non-transitory computer-readable media of clause 17, further comprising instructions that, when executed by the one or more processors, cause the one or more processors to perform the steps of storing in volatile memory for the at least a third portion of the first sync interval, a fourth version including fourth secure application data of the file that is modifiable during the at least the third portion of the first sync interval, and marking the second version of the file as not modifiable during the at least the third portion of the first sync interval, where subsequent to the first sync interval, the second version of the file stored in volatile memory replaces the third version of the file in nonvolatile memory.

19. The one or more non-transitory computer-readable media of clause 17 or 18, where the file includes a first set of data and a first set of metadata and further comprising instructions that, when executed by the one or more processors, cause the one or more processors to perform the steps of replacing in nonvolatile memory during the first sync interval, a second set of metadata included in the third version of the file with the first set of metadata, and replacing in nonvolatile memory subsequent to the first sync interval, a second set of data included in the third version of the file with the first set of data.

20. The one or more non-transitory computer-readable media of any of clauses 17-19, where the first secure application data includes at least one of a message security layer (MSL) token or a secure identifier.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synchronizing files between volatile memory and nonvolatile memory, the method comprising:
  storing, in the volatile memory for at least a first portion of a first sync interval that comprises a predetermined time period between successive syncs that write at least one version of the file from the volatile memory to the nonvolatile memory, a first version of a file that is not modifiable during the at least the first portion of the first sync interval;
  storing, in the volatile memory for at least a second portion of the first sync interval, a second version of the file that is modifiable during the at least the second portion of the first sync interval; and
  subsequent to the first sync interval:
    replacing, in the nonvolatile memory, a third version of the file with the first version of the file stored in volatile memory, and
    marking the second version of the file as not modifiable during at least a first portion of a second sync interval.

2. The computer-implemented method of claim 1, further comprising:
  storing in volatile memory for the at least a third portion of the first sync interval, a fourth version of the file that is modifiable during the at least the third portion of the first sync interval; and
  marking the second version of the file as not modifiable during the at least the third portion of the first sync interval,
  wherein subsequent to the first sync interval, the second version of the file stored in volatile memory replaces the third version of the file in nonvolatile memory.

3. The computer-implemented method of claim 2, wherein storing the fourth version of the file comprises:
  accessing the second version of the file;
  changing data included in the second version of the file to generate modified data; and
  storing the fourth version of the file that includes the modified data.

4. The computer-implemented method of claim 2, further comprising, for at least the third portion of the first sync interval, marking the first version of the file for deletion.

5. The computer-implemented method of claim 2, wherein volatile memory stores at least three versions of the file for at least the third portion of the first sync interval, wherein at least one version included in the at least three versions replaces the third version of the file in nonvolatile memory subsequent to the first sync interval.

6. The computer-implemented method of claim 1, further comprising generating a first name for the first version of the file based on a value generated by a system clock.

7. The computer-implemented method of claim 1, wherein the first version of the file includes a first set of data and a first set of metadata.

8. The computer-implemented method of claim 1, wherein the file includes secure application data.

9. The computer-implemented method of claim 8, wherein the secure application data includes at least one of a message security layer (MSL) token or a secure identifier.

10. A device for synchronizing files between volatile memory and nonvolatile memory, the device comprising:
  a memory subsystem that stores one or more versions of a file, the memory subsystem comprising volatile memory and nonvolatile memory; and
  a processor coupled to the memory subsystem that:
    stores in the volatile memory for at least a first portion of a first sync interval that comprises a predetermined time period between successive syncs that write at least one version of the file from the volatile memory to the nonvolatile memory, a first version of the file that is not modifiable during the at least the first portion of the first sync interval, wherein the first version of the file comprises an inode that includes a first set of data and a first set of metadata;
    storing in volatile memory for at least a second portion of the first sync interval, a second version of the file that is modifiable during the at least a second portion of the first sync interval; and
    subsequent to the first sync interval:
      replacing in the nonvolatile memory, a third version of the file with the first version of the file stored in volatile memory, and marking the second version of the file as not modifiable during at least a portion of a second sync interval.

11. The device of claim 10, further comprising:
storing in volatile memory for the at least a third portion of the first sync interval, a fourth version of the file that is modifiable during the at least the third portion of the first sync interval; and
marking the second version of the file as not modifiable during the at least the third portion of the first sync interval,
wherein subsequent to the first sync interval, the second version of the file stored in volatile memory replaces the third version of the file in nonvolatile memory.

12. The device of claim 10, further comprising replacing, in nonvolatile memory during the first sync interval, a second set of metadata included in the third version of the file with the first set of metadata.

13. The device of claim 10, further comprising replacing, in nonvolatile memory subsequent to the first sync interval, a second set of data included in the third version of the file with the first set of data.

14. The device of claim 10, wherein the first set of metadata includes a checksum of the first set of data.

15. The device of claim 10, wherein the processor further generates a first name for the first version of the file based on a first clock value generated by a system clock.

16. The device of claim 15, wherein the processor further:
compares a first value associated with the first name to a current value of the system clock; and
when the first name is greater than the current value:
generates a second value that is less than the current value,
generates a second name based on the second value, and
renames the first version of the file with the second name.

17. One or more non-transitory computer-readable media storing instructions that, when executed by one or more processors, cause the one or more processors to synchronize files between volatile memory and nonvolatile memory by performing the steps of:
storing, in the volatile memory for at least a first portion of a first sync interval that comprises a predetermined time period between successive syncs that write at least one version of the file from the volatile memory to the nonvolatile memory, a first version of a file including first secure application data that is not modifiable during the at least the first portion of the first sync interval;
storing, in volatile memory for at least a second portion of the first sync interval, a second version of the file including second secure application data that is modifiable during the at least the second portion of the first sync interval; and
subsequent to the first sync interval:
replacing in the nonvolatile memory, a third version of the file including third secure application data with the first version of the file stored in volatile memory, and
marking the second version of the file as not modifiable during at least a first portion of a second sync interval.

18. The one or more non-transitory computer-readable media of claim 17, further comprising instructions that, when executed by the one or more processors, cause the one or more processors to perform the steps of:
storing in volatile memory for the at least a third portion of the first sync interval, a fourth version including fourth secure application data of the file that is modifiable during the at least the third portion of the first sync interval; and
marking the second version of the file as not modifiable during the at least the third portion of the first sync interval,
wherein subsequent to the first sync interval, the second version of the file stored in volatile memory replaces the third version of the file in nonvolatile memory.

19. The one or more non-transitory computer-readable media of claim 17, wherein the file includes a first set of data and a first set of metadata and further comprising instructions that, when executed by the one or more processors, cause the one or more processors to perform the steps of:
replacing in nonvolatile memory during the first sync interval, a second set of metadata included in the third version of the file with the first set of metadata; and
replacing in nonvolatile memory subsequent to the first sync interval, a second set of data included in the third version of the file with the first set of data.

20. The one or more non-transitory computer-readable media of claim 17, wherein the first secure application data includes at least one of a message security layer (MSL) token or a secure identifier.

* * * * *